United States Patent
Byxbe et al.

(10) Patent No.: US 11,282,400 B2
(45) Date of Patent: Mar. 22, 2022

(54) RUNWAY OVERRUN AWARENESS ALERTING SYSTEM WITH DISCRETE INDICATOR

(71) Applicant: Rockwell Collins, Inc., Cedar Rapids, IA (US)

(72) Inventors: Valerie R. Byxbe, Cedar Rapids, IA (US); Darin M. Underwood, Cedar Rapids, IA (US); Tony Vander Velden, Cedar Rapids, IA (US); Taylor Martin, Cedar Rapids, IA (US); Bernard S. McCaffrey, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/939,770

(22) Filed: Jul. 27, 2020

(65) Prior Publication Data
US 2022/0028288 A1  Jan. 27, 2022

(51) Int. Cl.
*G08G 5/02* (2006.01)
*B64F 1/18* (2006.01)
*G09G 5/377* (2006.01)

(52) U.S. Cl.
CPC .............. *G08G 5/025* (2013.01); *B64F 1/18* (2013.01); *G09G 5/377* (2013.01); *G09G 2380/12* (2013.01)

(58) Field of Classification Search
None
See application file for complete search history.

(56) References Cited

U.S. PATENT DOCUMENTS

| | | | | |
|---|---|---|---|---|
| 3,789,356 A | * | 1/1974 | Harenberg, Jr. | G08G 5/0021 340/972 |
| 5,353,022 A | * | 10/1994 | Middleton | G08G 5/025 340/959 |
| 7,916,042 B2 | * | 3/2011 | Constans | G08G 5/025 340/945 |
| 9,008,873 B1 | | 4/2015 | Phillips et al. | |
| 9,399,524 B2 | | 7/2016 | He et al. | |

(Continued)

FOREIGN PATENT DOCUMENTS

EP  3636543 A1  4/2020

OTHER PUBLICATIONS

Extended Search Report for European Application No. 21188031.5 dated Nov. 18, 2021, 9 pages.

*Primary Examiner* — Fekadeselassie Girma
(74) *Attorney, Agent, or Firm* — Suiter Swantz pc llo (57) ABSTRACT

An aircraft-based runway overrun awareness alerting system (ROAAS) for an aircraft primary flight display (PFD) is disclosed. In embodiments, the ROAAS is embodied aboard an aircraft and tracks the position and heading of the aircraft. Further, the ROAAS tracks the energy state of the aircraft as it approaches a runway for landing. Based on the current energy state, as well as the runway parameters, the ROAAS predicts a landing point for the aircraft along the runway. Based on this landing point, as well as the current energy state, the ROAAS determines the current likelihood of runway excursion (e.g., that the aircraft will not have sufficient runway remaining to decelerate or stop) and displays this likelihood as a dynamic graphic element not integrated into any other instruments or components displayed by the PFD.

10 Claims, 5 Drawing Sheets

(56) References Cited

U.S. PATENT DOCUMENTS

| | | | |
|---|---|---|---|
| 9,499,279 B2 | 11/2016 | He et al. | |
| 9,527,601 B2 | 12/2016 | Wyatt et al. | |
| 10,214,300 B2 | 2/2019 | Feyereisen et al. | |
| 10,518,897 B2 | 12/2019 | Charbonnier et al. | |
| 10,635,256 B2* | 4/2020 | Lepage | G01C 23/005 |
| 11,004,347 B1* | 5/2021 | Byxbe | G08G 5/0021 |
| 2003/0132860 A1* | 7/2003 | Feyereisen | G01C 23/00 |
| | | | 340/973 |
| 2004/0075586 A1* | 4/2004 | Glover | G08G 5/0086 |
| | | | 340/963 |
| 2004/0167685 A1* | 8/2004 | Ryan | G08G 5/0086 |
| | | | 701/16 |
| 2011/0238240 A1* | 9/2011 | Barral | G01C 23/00 |
| | | | 701/14 |
| 2012/0081236 A1* | 4/2012 | Best | G08G 5/0021 |
| | | | 340/945 |
| 2013/0253738 A1* | 9/2013 | Fucke | G01C 23/00 |
| | | | 701/14 |
| 2014/0100722 A1* | 4/2014 | Louise | G01C 23/00 |
| | | | 701/14 |
| 2014/0121928 A1* | 5/2014 | Kurumisawa | B60T 8/1755 |
| | | | 701/70 |
| 2014/0257601 A1 | 9/2014 | Horne et al. | |
| 2015/0307207 A1* | 10/2015 | Meunier | B62D 43/02 |
| | | | 701/4 |
| 2016/0090193 A1* | 3/2016 | He | G08G 5/0021 |
| | | | 340/971 |
| 2016/0107766 A1* | 4/2016 | He | G08G 5/025 |
| | | | 701/7 |
| 2017/0275020 A1 | 9/2017 | Charbonnier et al. | |
| 2020/0150689 A1 | 5/2020 | Khatwa et al. | |

* cited by examiner

RUNWAY OVERRUN AWARENESS ALERTING SYSTEM WITH DISCRETE INDICATOR

CROSS-REFERENCE TO RELATED APPLICATIONS

The instant application is related to, and herein incorporates by reference in its entirety, the concurrently filed U.S. patent application Ser. No. 16/939,600.

TECHNICAL FIELD

The subject matter disclosed herein is directed generally to aircraft display systems and more particularly to symbology for primary flight displays (PFD).

BACKGROUND

Runway overruns are a threat to aircraft landing on, or taking off from, an airport runway. For example, an aircraft on approach to a runway at a given airspeed and angle of attack (which in turn may be affected by winds over the runway and other external factors) will touch down at a particular point along the runway. If there is not enough runway remaining between this landing point and the end of the runway for the aircraft to decelerate after touchdown, overrun may result: the aircraft may exit the runway at its far end, resulting in damage to the aircraft, injury to passengers and crew, or worse. Conventional runway overrun prevention systems provide visual and/or aural warnings of a potential excursion, but these systems may integrate visual warnings into an already complex primary flight display (PFD) or navigational display.

SUMMARY

An aircraft-based runway overrun awareness alerting system (ROAAS) is disclosed. In embodiments, the ROAAS includes control processors for determining a navigational state of an aircraft on approach to landing (e.g., its position and heading relative to its intended runway) as well as the energy state of the aircraft (e.g., airspeed, attitude, acceleration or deceleration). The control processors determine the attributes of the runway to which the aircraft is on approach (e.g., orientation, length, endpoints, environmental conditions overhead) and based on these diverse data sources continually predict the likely landing point of the aircraft upon the runway. Based on the predicted landing point, the ROAAS continually evaluates the probability of an excursion or overrun of the runway. The ROAAS continually revises the predicted landing point and excursion probability based on changes in the aircraft position and energy state. The ROAAS includes a display device for displaying navigational instruments and the primary flight display (PFD). When conditions are consistent with a nonzero probability of excursion, the ROAAS may display dynamic symbology corresponding to the excursion probability within the PFD.

In some embodiments, the display device revises the displayed symbology based on changes or revisions to the runway excursion probability.

In some embodiments, the position, heading, and energy state may be determined based on information received from the flight management system (FMS) and/or the engine indicator and crew alerting system (EICAS).

In some embodiments, the position, heading, and energy state may be determined based on runway data or other information received from ground control facilities or other sources external to the aircraft.

In some embodiments, the display device generates synthetic vision or enhanced vision (SVS, EVS) content of the runway environment and superimposes the ROAAS symbology over the SVS/EVS content.

In some embodiments, the ROAAS symbology includes a gauge and a color element for representing the severity of the runway excursion probability.

In some embodiments, the ROAAS represents a change in the runway excursion probability by a movement of an indicator relative to the gauge and/or a color change, e.g., from a less severe to a more severe likelihood.

In some embodiments, the gauge is divided into adjacent regions, each region corresponding to a severity level and a movement of the indicator into an adjacent region corresponding to a color change.

In some embodiments, the ROAAS symbology is displayed within unused areas of the PFD, e.g., not already occupied by PFD indicator or aircraft instrumentation displays.

In some embodiments, the ROAAS symbology is automatically displayed with aircraft conditions (or combinations of conditions) contributing to runway excursion reach or exceed a threshold level (e.g., a nonzero probability of excursion).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed here in are directed to a runway overrun awareness alert system 120 (ROAAS) that assesses from the energy state of an aircraft on approach to land at a runway, predicting the likely touchdown point on the runway based on the current position and heading of the aircraft as well as the particulars of the runway itself (e.g., its length and orientation). Given this touchdown point and the current energy state (angle of attack, airspeed, acceleration/deceleration), the ROAAS continually determines a quantified variable projecting the likelihood (e.g., excursion probability) that the aircraft will overrun the runway, i.e., be unable to stop before exiting the far end of the runway. As the aircraft position and energy state change from moment to moment, the ROAAS reassesses the excursion probability and displays the quantified variable to the pilot in a graphic form digestible at a glance and segregated from other primary flight or instrument displays, so that the pilot can always peripherally assess the excursion probability at any time without interrupting any other flight information the pilot may be monitoring during the approach and landing segments.

Figure 1:
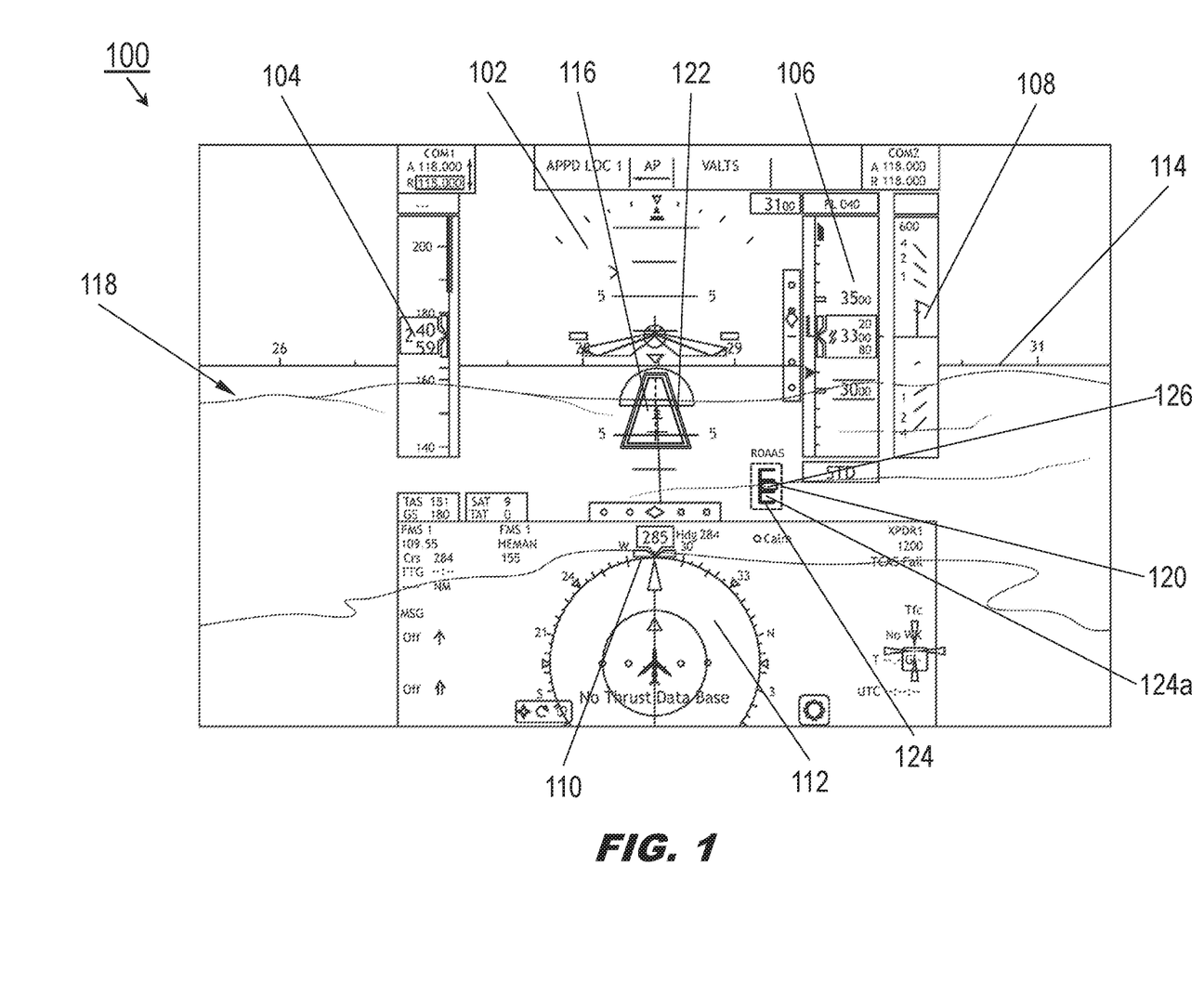
FIG. 1 is a block diagram illustrating a primary flight display (PFD) incorporating a runway overrun awareness alert system (ROAAS) according to example embodiments of this disclosure.

Referring to FIG. 1, a primary flight display (PFD) 100 is disclosed. The PFD 100 may include attitude indicator 102, airspeed indicator 104, altimeter 106, vertical speed indicator 108, turn coordinator 110, horizontal situation indicator 112, and artificial horizon 114.

In embodiments, the PFD 100 may be embodied aboard an aircraft on approach to a runway 116. For example, the PFD 100 may incorporate, or may be a display component of, an enhanced vision system (EVS) and/or a synthetic vision system (SVS), such that aircraft instruments and/or PFD components (e.g., the attitude indicator 102, airspeed indicator 104, altimeter 106, vertical speed indicator 108, turn coordinator 110, horizontal situation indicator 112, and artificial horizon 114) are graphically superimposed over an enhanced-vision representation 118 of the environment surrounding the runway 116 (including, e.g., terrain, runway or airport facilities, and explanatory symbology noting natural or manmade features or proximate aircraft).

While the aircraft on approach to the runway 116, the pilot may be monitoring multiple indicators simultaneously while controlling the descent of the aircraft. The energy state of the aircraft may similarly be in constant flux from moment to moment, based on, e.g., the current airspeed, altitude, angle of attack, or factors external to the aircraft, such as shifting wind patterns over the runway 116. Accordingly, the pilot may be aiming for a particular landing point or region of the runway 116 in order to allow sufficient runway to decelerate or stop after touching down, but the actual likelihood of achieving the intended landing point (e.g., as opposed to leaving insufficient runway and risking a runway excursion or overrun) may vary along with internal and external conditions.

In embodiments, the PFD 100 may incorporate a runway overrun awareness alert system 120 (ROAAS). For example, the ROAAS 120 may augment aircraft takeoff and landing awareness systems (e.g., TLAF) by monitoring multiple dimensions of aircraft data sources to continually evaluate whether conditions exist that warrant display of the ROAAS; when these conditions are determined to exist, and as long as these conditions persist, the ROAAS will be displayed. In embodiments, while on approach to the runway 116, the ROAAS 120 may monitor the energy state of the aircraft along with its position and heading relative to the runway and the parameters of the runway itself (e.g., length, orientation, environmental conditions). If, for example, one or more conditions or combinations of conditions meet or exceed predetermined threshold levels, the display of ROAAS symbology may be triggered. By way of a non-limiting example, the aircraft state may indicate an angle of attack consistent with approach and landing, but airspeed may be in excess of a speed consistent with the current aircraft position relative to the runway, and a tailwind may be present. Based on these observations, the ROAAS 120 may conclude that the likelihood of a runway overrun is nonzero, and that the threshold for ROAAS symbology display has been crossed. Should the aircraft abort the attempted landing and go around for a subsequent attempt, the ROAAS 120 may conclude that display conditions no longer exist and cease display of ROAAS symbology.

In embodiments, based on the current aircraft energy state, the ROAAS 120 may predict the likely landing point of the aircraft relative to the runway 116 based on the best information available. Based on this predicted landing point, and the aircraft energy state, the ROAAS 120 may further predict the likelihood of a runway excursion. The ROAAS 120 may send the predicted likelihood back to the EVS/SVS system for display to the pilot via the PFD 100. For example, while the PDF 100 may incorporate runway excursion warnings, these warnings may only serve to warn the pilot of conditions consistent with a likely excursion when they exist (as opposed to, e.g., proactive prevention of excursion conditions). Further, runway excursion warnings may be incorporated into other display elements of the PDF (e.g., the EVS-generated runway 122 corresponding to the runway 116, which may flash red to warn of a potential excursion) and therefore may not be as quickly and easily digested by the pilot.

It is contemplated that the ROAAS 120 may provide a concise, discrete assessment of excursion probability that the pilot, in conjunction with other data provided by the PFD 100 (e.g., airspeed, angle of attack, altitude), may rapidly assimilate while managing the descent and landing phases. For example, the predictive ability of the ROAAS 120 may be enhanced by more robust runway data (e.g., runway conditions, weather conditions) or even performance data relevant to the aircraft or aircraft type, e.g., prior flight performance during approach and landing phases under similar conditions, braking performance and methods.

In embodiments, the graphic representation displayed by the PDF 100 may represent a quantified variable determined by the ROAAS 120 and corresponding to an assessment of the most likely landing point relative to the runway and the aircraft energy state relative to the runway at a given moment. This quantified variable may be recalculated as the contributing factors (e.g., the aircraft airspeed, angle of attack, and position/heading relative to the runway) change, and the corresponding graphic representation refreshed by the PFD 100.

In embodiments, the ROAAS 120 may be displayed separate from (e.g., not integrated into) any other instruments, indicators, or EVS elements displayed by the PDF 100. In embodiments, the ROAAS 120 may be displayed within the PFD 100 as a three-segment gauge 124 and indicator 126. For example, as the energy state of the aircraft changes (along with any other external conditions accessible to the ROAAS 120) the ROAAS may display the current excursion likelihood on a continuum of increasing severity (e.g., as represented by the current position of the indicator 126 within the gauge 124) and within a broad level of increasing severity (e.g., as represented by the current segment 124a of the gauge 124 occupied by the indicator 126). If, for example, the indicator 126 reaches the top of the gauge 124 with no remedial action taken on the part of the pilot, a visual and/or aural excursion warning may be displayed by the PFD 100.

Figure 2:
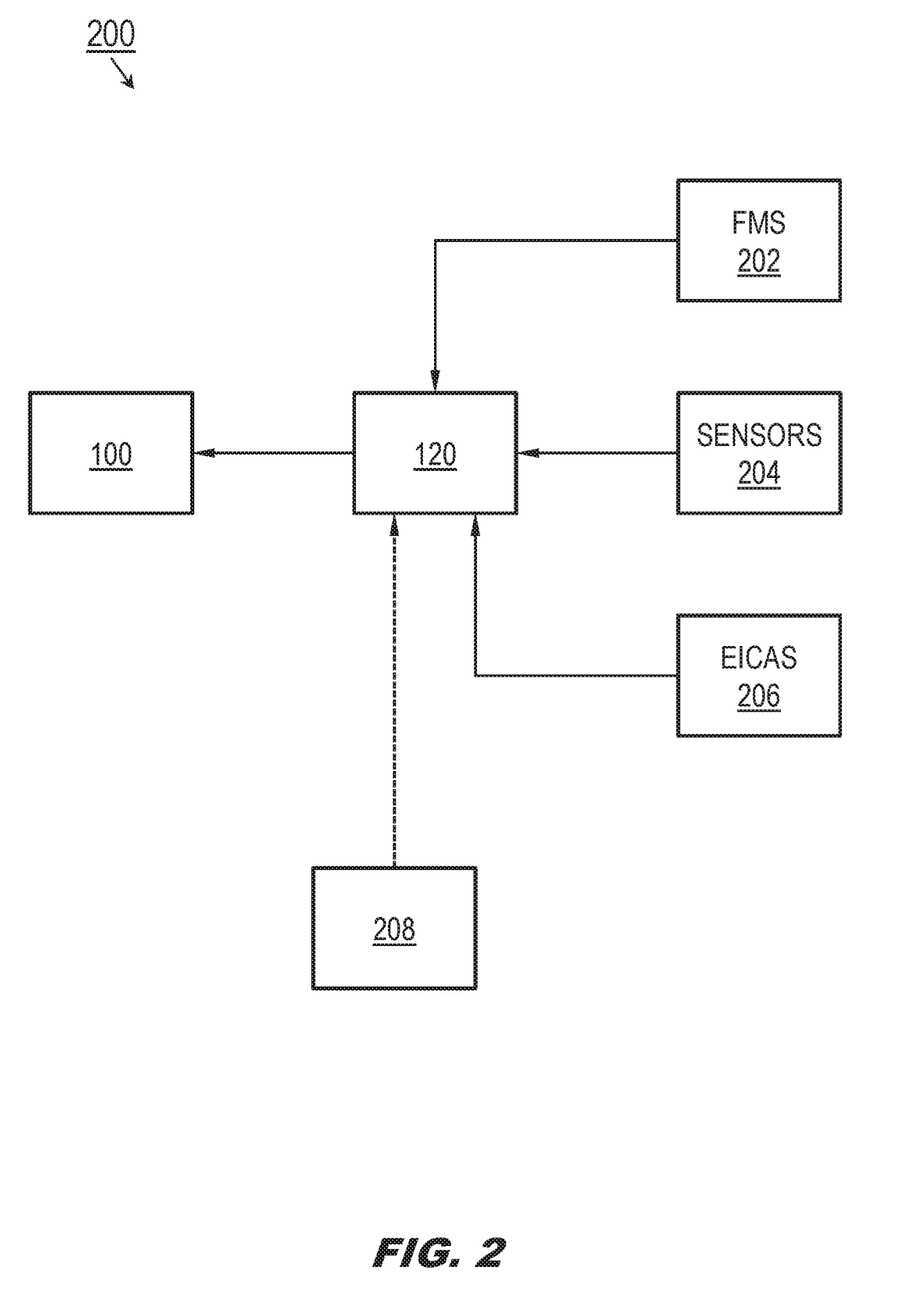
FIG. 2 is a block diagram of the ROAAS of FIG. 1 and embodying aircraft.

Referring to FIG. 2, the aircraft 200 is disclosed. The aircraft 200 may include a flight management system 202 (FMS), aircraft-based sensors 204, and engine indicator/crew alerting system 206 (EICAS).

In embodiments, the ROAAS 120 may be embodied aboard the aircraft 200 and may communicate with other sources, both onboard and external to the aircraft, to receive updated aircraft data. As noted above, the ROAAS 120 may consider multiple data sources and their effect on each other to determine whether display conditions exist and, once display conditions are determined to exist, to continually evaluate whether conditions persist or, for example, have been resolved by pilot action. For example, the ROAAS 120 may receive continual updates from the flight management system 202 (FMS) with respect to the position of the aircraft and its progress relative to the flight plan of the aircraft (or, e.g., relative to the current flight segment or phase). Further, the FMS 202 may provide runway, instrument approach, beacon or waypoint data, and other navigational database data to the ROAAS.

In embodiments, the ROAAS 120 may receive additional aircraft performance data from aircraft-based sensors 204 (e.g., airspeed indicators, altimeters, angle of attack sensors, barometers) and engine indicator/crew alerting systems 206 (EICAS). For example, the EICAS 206 may provide updates as to the current and evolving states of aircraft engines, fuel systems, hydraulic and pneumatic systems, and aircraft components not in direct communication with navigation systems but whose performance regardless may affect the energy state of the aircraft. In some embodiments, the FMS 202 and/or EICAS 206 may provide historical performance data associated with prior approaches and landings of the aircraft 200 at the runway (116, FIG. 1).

In embodiments, the ROAAS 120 may receive some information from external sources 208 not onboard the aircraft. For example, the ROAAS 120 may receive position, runway, or weather data from ground-based facilities (e.g., wind pattern data measured by a ground station proximate to the runway 116).

In embodiments, based on a continual evaluation of these diverse data sources, the ROAAS 120 may determine that conditions exist that warrant display of the ROAAS symbology within the PFD 100. For example, the ROAAS 120 may be displayed as long as these conditions continue to exist (e.g., until the aircraft has touched down or remedial action on the part of the pilot or crew sufficiently changes the observed conditions).

Figure 3A:
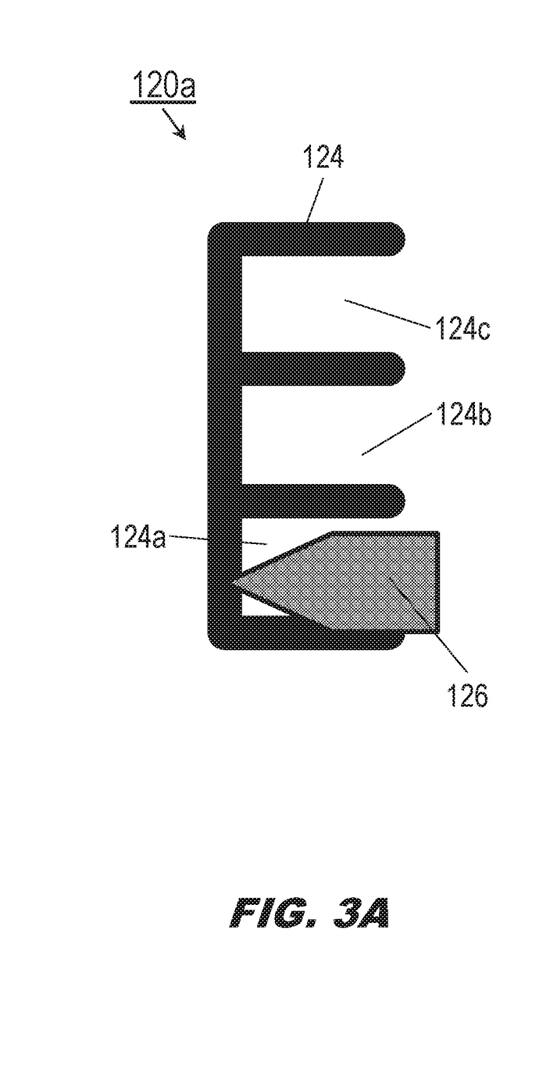
FIGS. 3A through 3C illustrate components and operations of the ROAAS of FIG. 1.

Referring to FIG. 3A, the ROAAS 120a may be implemented and may function similarly to the ROAAS 120 of FIG. 1, except that the ROAAS 120a may incorporate color changes to indicate changes in severity.

In embodiments, the gauge 124 may be split into three (or, e.g., four, five, or any other appropriate number of) regions 124a-c corresponding to increasing levels of severity. While the transition of the indicator 126 between regions 124a-c may indicate to the pilot an increasing severity (e.g., an increasing likelihood of runway excursion). the ROAAS 120a may also indicate increasing severity (e.g., via a full color PFD 100) via real-time color changes to the indicator 126. For example, the ROAAS 120a of FIG. 3A may correspond to a nominal state of the aircraft (200, FIG. 2) on approach to the runway (116, FIG. 1) wherein the predicted landing point of the aircraft is within acceptable distance of the end of the runway and the likelihood of incursion is therefore slim to none. Accordingly, the indicator 126 may remain within the lowermost region 124a and may maintain a green color.

Figure 3B:
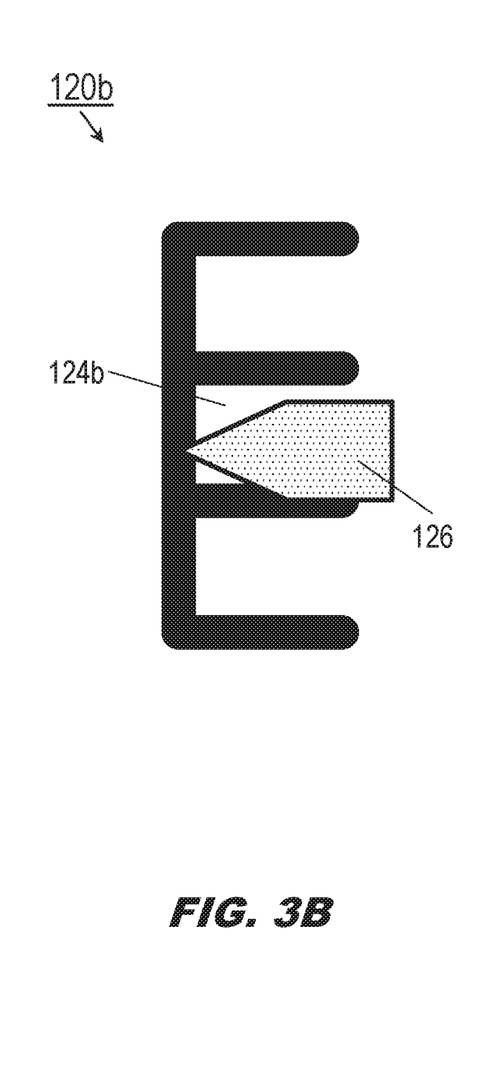
Figure 3C:
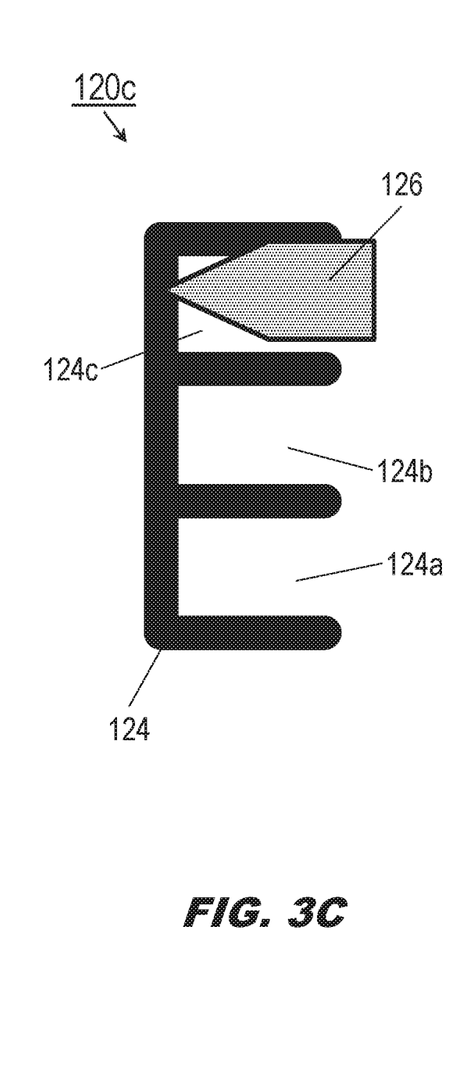

Referring now to FIGS. 3B and 3C, the ROAAS 120b-c may be implemented and may function similarly to the ROAAS 120a of FIG. 3A, except that the ROAAS 120b may indicate an increased likelihood of runway excursion (based on, e.g., changes in the energy state of the aircraft and/or to the predicted landing point). For example, the indicator 126 may rise into the middle region 124b and change color from green to yellow. Similarly, the ROAAS 120c of FIG. 3C may indicate a further increase in severity, e.g., associated with a predicted landing point in an area of the runway 116 where runway overrun is highly likely (and where immediate corrective action by the pilot may be indicated). For example, the indicator 126 may rise into the topmost region 124c of the gauge 124 and change color to red. In embodiments, the gauge 124, regions 124a-c and indicator 126 may incorporate any other appropriately visible shapes and colors in order to indicate the appropriate likelihood of runway incursion.

Figure 4A:
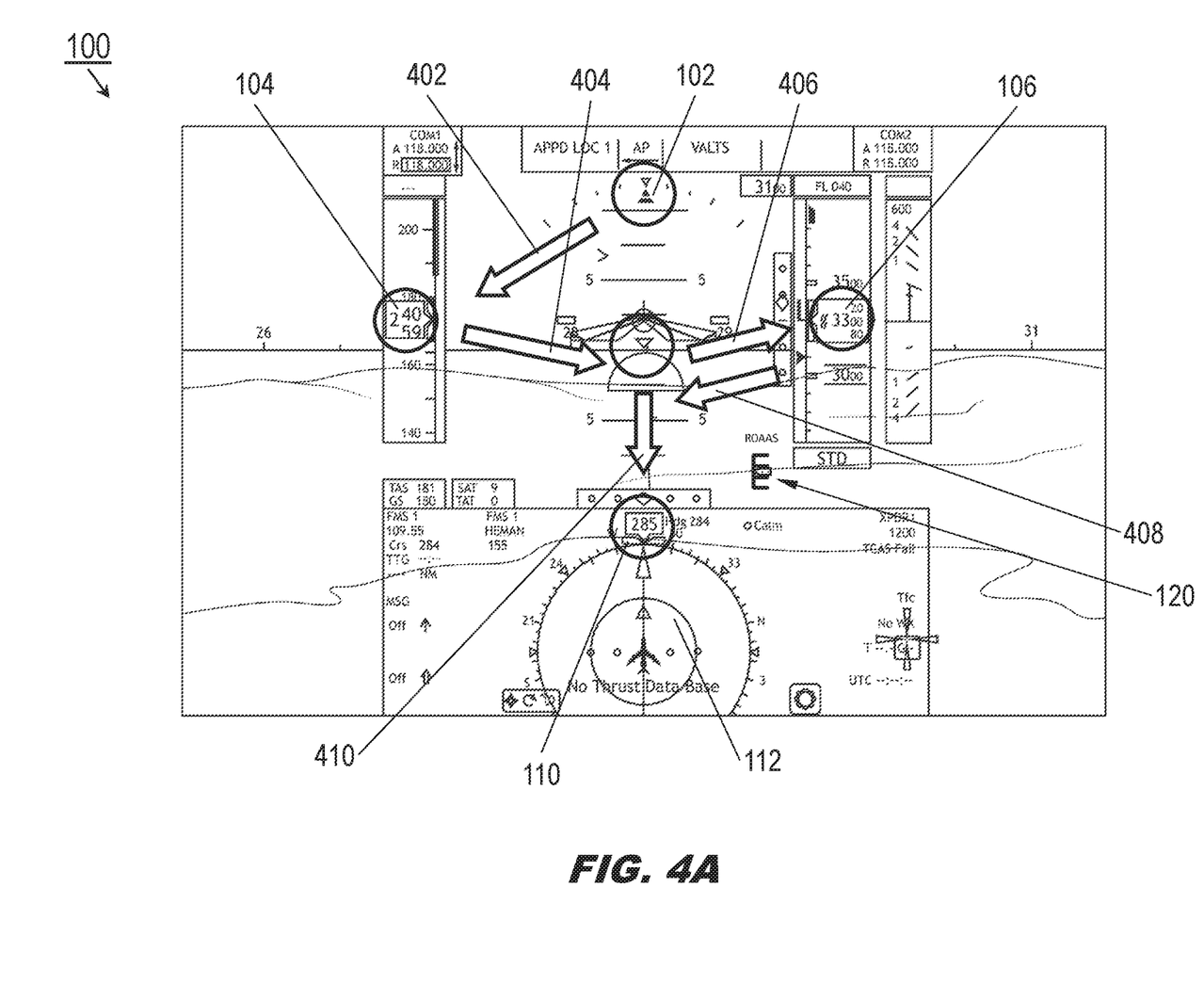
FIG. 4A is an illustration of scanning patterns for the PFD of FIG. 1.

Referring to FIG. 4A, the PFD 100 is disclosed.

In embodiments, the ROAAS 120 may be displayed in an area of the PFD 100 not otherwise dedicated to aircraft instruments or PFD components. For example, the placement of the ROAAS 120 may be based on observed pilot scan patterns of the PFD 100. It is contemplated that the pilot may construct a multidimensional model of the aircraft energy state in real time, based on multiple discrete and easily assimilated data points. Based on this evolving real time model, the pilot may make more informed decisions regarding, e.g., whether to continue or abort a landing or descent in progress (and if to abort, at what point to do so). For example, the pilot's scanning pattern with respect to the PFD may include starting at the attitude indicator 102 to check pitch and roll information, scanning left (402) to check the airspeed indicator 104, scanning center (404) and then right (406) to monitor the altimeter 106, returning to center (408) and then scanning down (410) to the turn coordinator 110 and horizontal situation indicator 112. The ROAAS 120 may be positioned relative to the PFD 100 such that the ROAAS appears at the periphery of the pilot's scan pattern where its information may be easily captured in the pilot's peripheral vision.

Figure 4B:
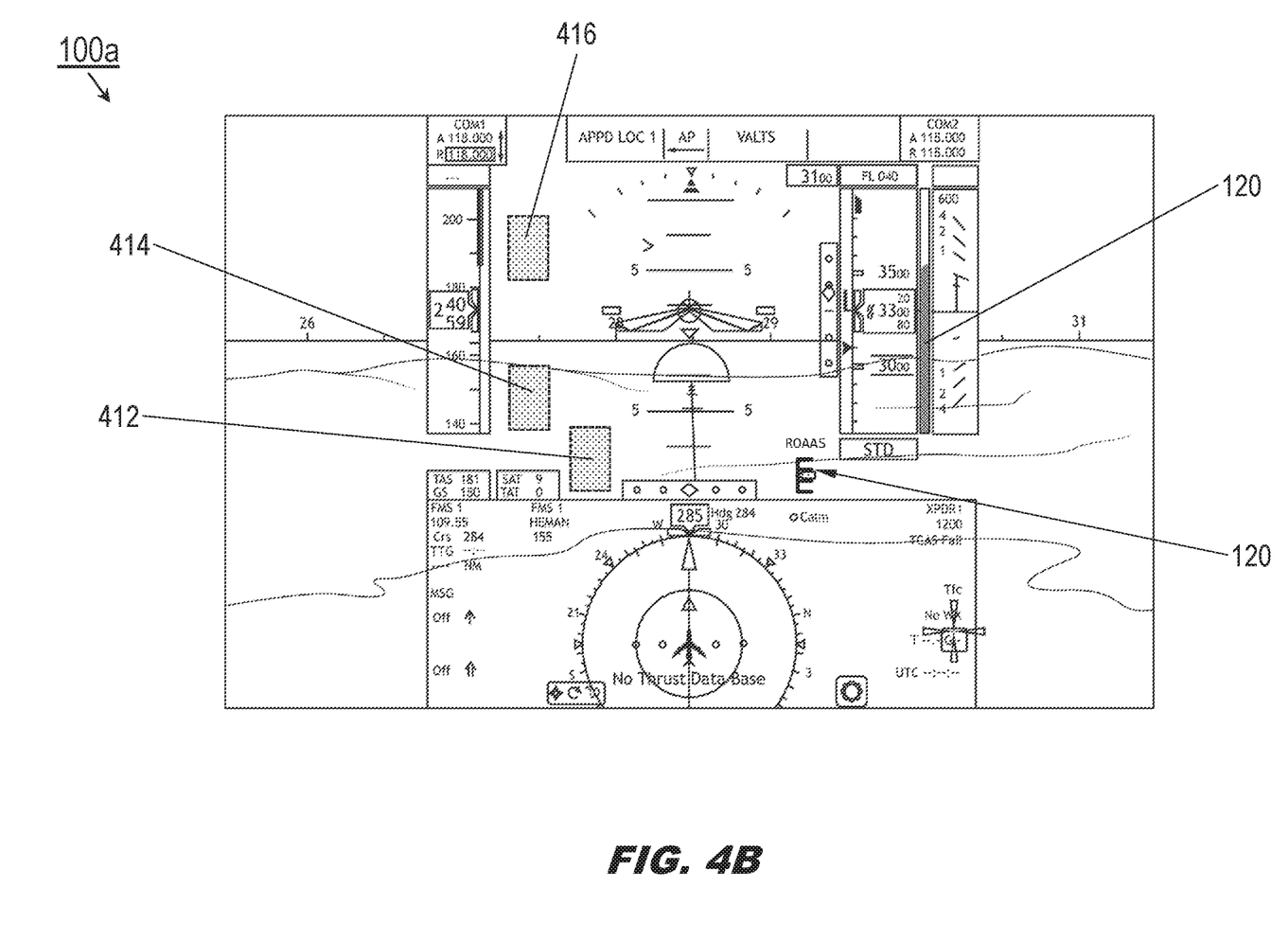
FIG. 4B is an illustration of alternative placements of the ROAAS of FIG. 1 within the PFD.

Referring also to FIG. 4B, the PFD 100a may be implemented and may function similarly to the PFD 100 of FIGS. 1 through 4A, except that the ROAAS 120 may be displayed in other otherwise undedicated areas (412, 414, 416) of the PFD. For example, the ROAAS 120 may be positioned in other parts within the PFD 100a that may fall within the periphery of the pilot's scan pattern.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based runway overrun awareness alerting system, comprising:
   one or more processors installable aboard an aircraft and configured for:
   determining navigational information corresponding to the aircraft;
   determining an energy state of the aircraft;
   determining one or more runway attributes corresponding to a proximate runway;
   predicting, based on the determined navigational information, energy state, and runway attributes, a landing point on the proximate runway;
   predicting, based on at least the predicted landing point and the energy state, a runway excursion probability; and
   revising at least one of the predicted landing point or the predicted runway excursion probability based on one or more of a change in the navigational information or a change in the energy state;
   and
   at least one display device in communication with the one or more processors, the display device configured to:
   display, within a display surface, one or more of a primary flight display (PFD) components and navigational instruments corresponding to the aircraft; and
   display at least one dynamic graphic representation corresponding to the predicted runway excursion probability, wherein the dynamic graphic representation is not integrated with the one or more PFD components and navigational instruments,
   wherein the dynamic graphic representation comprises a gauge and an indicator, and
   wherein a location of the indicator directly indicates the predicted runway excursion probability, and a change in the location of the indicator directly indicates a change in the predicted runway excursion probability.

2. The aircraft-based runway overrun awareness alerting system of claim 1, wherein the at least one display device is configured to revise the at least one dynamic graphic representation based on the revised runway excursion probability.

3. The aircraft-based runway overrun awareness alerting system of claim 1, wherein the one or more processors are configured to determine the navigational information and the energy state based on data received from one or more of a flight management system (FMS) and an engine indicator and crew alerting system (EICAS).

4. The aircraft-based runway overrun awareness alerting system of claim 1, wherein the one or more processors are configured to determine one or more of the navigational information, the energy state, or the runway attributes based on data received from at least one source external to the aircraft.

5. The aircraft-based runway overrun awareness alerting system of claim 1, wherein the display device is configured to:
   generate at least one of a synthetic vision display or an enhanced vision display associated with an environment proximate to the runway; and
   superimpose the one or more PFD components, the navigational instrument, and the dynamic graphic representation over the synthetic vision display or the enhanced vision display.

6. The aircraft-based runway overrun awareness alerting system of claim 1, wherein the dynamic graphic representation further comprises a color element.

7. The aircraft-based runway overrun awareness alerting system of claim 6, wherein the revising of the predicted runway excursion probability corresponds to:
   a movement of an indicator within the gauge; and
   a color change of the color element.

8. The aircraft-based runway overrun awareness alerting system of claim 7, wherein:
   the gauge is divided into a plurality of adjacent regions;

and
a movement of the indicator between two adjacent regions corresponds to the color change.

9. The aircraft-based runway overrun awareness alerting system of claim 1, wherein the at least one display device is configured to display the dynamic graphic representation within at least one region of the display surface not including a displayed PFD component or navigational instrument.

10. The aircraft-based runway overrun awareness alerting system of claim 1, wherein the at least one display device is configured to display the dynamic graphic representation when the one or more processors determine that one or more display conditions exceed a threshold level.

\* \* \* \* \*